US012798671B2

(12) United States Patent
Heilig et al.

(10) Patent No.: US 12,798,671 B2
(45) Date of Patent: Nov. 17, 2026

(54) METHOD FOR OPERATING A STEERING SYSTEM

(71) Applicant: Robert Bosch GmbH, Stuttgart (DE)

(72) Inventors: Arnulf Heilig, Schwaebisch Gmuend (DE); Dominik Meister, Kupferzell (DE); Florian Rochel, Schorndorf (DE); Philipp Scheffler, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/285,951

(22) Filed: Jul. 30, 2025

(65) Prior Publication Data

US 2026/0035034 A1 Feb. 5, 2026

(30) Foreign Application Priority Data

Jul. 31, 2024 (DE) ..................... 10 2024 207 202.8

(51) Int. Cl.
*B62D 6/00* (2006.01)

(52) U.S. Cl.
CPC .................................... *B62D 6/008* (2013.01)

(58) Field of Classification Search
CPC .......... B62D 5/04; B62D 5/0481; B62D 3/12; B62D 6/008; B62D 6/00; B62D 6/002
USPC ........................................................... 701/41
See application file for complete search history.

(56) References Cited

U.S. PATENT DOCUMENTS 11,498,613 B2* 11/2022 Varunjikar ........... B62D 5/0481
2012/0046836 A1* 2/2012 Strecker ................. B62D 6/008 701/41
2014/0163822 A1* 6/2014 Strecker ................. B62D 6/008 701/42
2017/0096161 A1* 4/2017 Ko ....................... B62D 15/024
2017/0232998 A1* 8/2017 Ramanujam ........... B62D 6/008 701/42
2020/0346687 A1* 11/2020 Sakaguchi ......... B62D 15/0235
2022/0250673 A1* 8/2022 Lin ...................... B62D 5/0484
2023/0382449 A1* 11/2023 Bergmann ............. B62D 6/008
2024/0317299 A1* 9/2024 Park ..................... B62D 5/0463
2025/0130040 A1* 4/2025 Kim ....................... G01B 21/26

FOREIGN PATENT DOCUMENTS

DE 10 2011 052 881 A1 2/2013
DE 10 2017 217 470 A1 4/2019
DE 10 2018 219 560 A1 3/2020

* cited by examiner

*Primary Examiner* — Sizo B Vilakazi

(74) *Attorney, Agent, or Firm* — Maginot, Moore & Beck LLP

(57) ABSTRACT

A method is for operating a steering system that includes at least one wheel steering angle adjuster having a rack for changing a wheel steering angle of at least one vehicle wheel. According to the method, a first rack force signal is determined based on a dynamic of the rack and a first calculation algorithm is used in determining the first rack force signal. An operating parameter is determined as a function of the first rack force signal, and is used to control at least one steering function. At least one second rack force signal is determined using a second calculation algorithm having a lower complexity as compared to the first calculation algorithm. A plausibility of the first rack force signal is monitored and/or checked based on the dynamic of the rack and based on the at least one second rack force signal.

14 Claims, 3 Drawing Sheets

METHOD FOR OPERATING A STEERING SYSTEM

This application claims priority under 35 U.S.C. § 119 to patent application no. DE 10 2024 207 202.8, filed on Jul. 31, 2024 in Germany, the disclosure of which is incorporated herein by reference in its entirety.

BACKGROUND

The disclosure is based upon a method for operating a steering system as described herein. The disclosure also relates to a computing unit for performing such a method and a vehicle comprising such a computing unit.

Various methods are known from the prior art in which a rack force is determined and the determined rack force or an operating parameter derived therefrom is used to control a vehicle and/or steering function.

For example, DE 10 2017 217 470 A1 discloses a method of operating a steering system, in which, based on a movement of the rack and using a neural network, a rack force signal is determined and one or more steering functions, such as a roadway feedback optimization, a tilting compensation, a blockage detection, a rack force dependent steering support and/or an adjustment of a steering feel, are carried out depending on the rack force signal.

Further, a method for determining a rack force in a steering system is known from DE 10 2011 052 881 A1, in which, depending on at least one force occurring in the steering system or at least one moment occurring in the steering system, a first rack force signal and, depending on at least one vehicle variable that characterizes a state of motion of the vehicle, a second rack force signal is determined, and wherein a resulting rack force is formed from the first rack force signal and the second rack force signal. In this regard, an influence of the first rack force signal and/or the second rack force signal may be adjusted to produce a desired steering feel on a steering handle of the steering system.

Furthermore, a method for operating a steering system in which the rack force is calculated based on a motion equation determined from a return force is known from DE 10 2018 219 560 A1. The rack force may then be utilized, for example, to provide information to a driver about a road surface.

Based on this, the task of the disclosure is, in particular, to provide a method for operating a steering system with improved properties in terms of operating efficiency. The problem as disclosed herein.

SUMMARY

The disclosure proceeds from a method, in particular a computer-implemented method, for operating a steering system, particularly during operation of the steering system in a vehicle, wherein the steering system comprises at least one wheel steering angle adjuster having a rack for changing a wheel steering angle of at least one vehicle wheel, wherein, based on a dynamic of the rack, the system determines a first rack force signal and, when determining the first rack force signal, uses a first calculation algorithm, with increased complexity in particular, and wherein, as a function of the first rack force signal, an operating parameter is determined, which is used in particular for controlling at least one steering function. For example, the steering function may correspond to a roadway feedback optimization, a tilting compensation, a blockage detection, a rack force dependent steering support, and/or an adjustment of a steering feel. However, alternatively or additionally, the operating parameter may also be used in a vehicle system other than the steering system, for example a braking system and/or a drive system, and used to control a corresponding vehicle function.

It is proposed that at least one second rack force signal is determined based on the dynamics of the rack for monitoring and/or checking the plausibility the first rack force signal, and that a second calculation algorithm with a lower complexity compared to the first calculation algorithm is used in determining the second rack force signal. Thus, the second rack force signal is used to at least monitor and/or check the plausibility of the first rack force signal. In addition, the second rack force signal may be advantageously considered in determining the operating parameter. In the present case, the rack force signals in particular define an interaction or an interdependency between the vehicle and a road surface or a subsurface. The more accurately the first rack force signal is calculated, therefore, the more realistically this interaction may be determined and, in particular, considered in the execution of steering functions. In contrast, a less precise rack force signal, i.e., the second rack force signal, may be sufficient to achieve a sufficiently high ASIL (Automotive Safety Integrity Level) rating to monitor and/or check the plausibility of the first rack force signal. Operational safety in particular may be increased by means of this configuration. In addition, efficiency, such as power efficiency, computational efficiency, and/or cost efficiency, may be improved.

The steering system is in particular provided as part of a vehicle, in particular a motor vehicle, and for providing a steering function. Preferably, the steering system is preferably designed as a steer-by-wire steering system, in which a steering input from a driver is preferably transmitted purely electrically to the vehicle wheels. The term "wheel steering angle adjuster" is to be understood in this context as an actuator unit which is operatively connected to at least one vehicle wheel, which is intended to transmit a steering specification to the vehicle wheel by changing a wheel steering angle of the vehicle wheel, and thereby advantageously control at least one alignment of the vehicle wheel and/or influence a direction of travel of the vehicle. To this end, the wheel steering angle adjuster comprises at least one rack, and in particular at least one steering actuator operatively connected to the rack, for example in the form of an electric motor. The wheel steering angle adjuster may in particular be designed as a single wheel actuator and be associated with precisely one, in particular steerable, vehicle wheel or designed as a central actuator and be associated with at least two, in particular steerable, vehicle wheels. The wheel steering angle adjuster may also be assigned to a vehicle axle configured as a rear axle or advantageously to a vehicle axle of the vehicle configured as a front axle. In particular, it should be understood that "the second calculation algorithm has a lower complexity as compared to the first calculation algorithm" means that the second calculation algorithm requires a lower number of input parameters and/or variables and/or processes and/or requires a lower computational power, in particular as compared to the first calculation algorithm. For example, the first calculation algorithm for calculating the first rack force signal may utilize a dynamic, or preferably a movement of the rack, and take into account at least one further vehicle parameter, such as a vehicle speed, and/or at least one further steering characteristic, such as, in particular, a transmission and/or engine response of the steering actuator and/or friction effects in the wheel steering angle adjuster and/or inertia effects in the wheel steering angle adjuster. The second calculation algorithm may also utilize a dynamic, or preferably movement, of the rack to calculate the second rack force signal, however, in calculating the second rack force signal, it may omit at least one of the aforementioned further vehicle parameters and/or further steering characteristics, or determine the further vehicle parameters and/or further steering characteristics by means of a simplified model and/or a simplified algorithm. Further, the first calculation algorithm and the second calculation algorithm could also include various steering models and/or vehicle models, such as a single track model, a two track model, and/or a kinematics model, to calculate the corresponding rack force signal.

Furthermore, the vehicle may comprise a computing unit, which is intended to perform the method for operating the steering system. The term "computing unit" is mainly understood to mean an electrical and/or electronic unit having an information input, information processing, and an information output. Advantageously, the computing unit also comprises at least one processor, at least one memory, at least one input means and/or output means, at least one operating program, at least one control routine, at least one calculation routine, at least one evaluation routine and/or at least one determination routine. In particular, the computing unit is provided to determine the first rack force signal based on a dynamic of the rack and to use the first calculation algorithm when determining the first rack force signal. In addition, the computing unit is in particular provided for determining the operating parameter as a function of the first rack force signal. Moreover, the computing unit is advantageously provided for monitoring and/or checking the plausibility of the first rack force signal. In this context, the computing unit is particularly provided to determine the second rack force signal based on the dynamic of the rack and to use the second calculation algorithm, which is in particular different from the first calculation algorithm, when determining the second rack force signal. Furthermore, the computing unit may be provided to determine a dynamic or a movement of the rack, for example, based on a detection signal of a rack position sensor and/or based on a movement of the steering actuator. Further, the computing unit may be provided to use the operating parameter to control at least one steering function. Preferably, the computing unit is integrated into a control device of the vehicle, for example a central vehicle control device, or a control device of the steering system. The term "intended" is to be understood in particular as specially programmed, designed and/or equipped. The fact that an object is intended for a specific function should be understood in particular to mean that the object fulfills and/or executes this specific function in at least one application and/or operating mode.

Further, it is proposed that the steering system comprises an operating unit that is mechanically separate from the at least one wheel steering angle adjuster with a steering handle, for example in the form of a steering wheel, as well as a feedback actuator cooperating with the steering handle, and the operating parameter is used at least to actuate the feedback actuator and thus in particular to generate a steering feel. In this case, the steering function accordingly corresponds in particular to a feedback moment provided by the feedback actuator for applying the steering handle or a steering feel generated by this on the steering handle. The actuation of the feedback actuator is preferably carried out according to the type of control. This may in particular provide a particularly advantageous steering feel, particularly in a steering system configured as a steer-by-wire steering system. Further, a safety concept with a sufficiently high ASIL rating may also be achieved without a torque sensor, in particular in the event that the behavior of the rack force is caused by the road geometry.

Moreover, it is proposed that the first rack force signal and/or the second rack force signal be calculated based on a motion equation of the rack. Consequently, the first rack force signal and/or the second rack force signal are preferably calculated based on the motion equation of the rack. In particular, an advantageously simple and/or efficient calculation of the rack force may be achieved by this.

According to one embodiment, it is proposed that a tolerance range for the first rack force signal is determined by means of the second rack force signal, and in the event that the first rack force signal is outside of the tolerance range for the first rack force signal, the first rack force signal is limited to the second rack force signal and/or by means of the second rack force signal. In the latter case, the first rack force signal may be limited to, for example, the tolerance range determined by the second rack force signal. In particular, in the event that the first rack force signal is within the limits of the tolerance range for the first rack force signal, the operating parameter is determined directly from the first rack force signal. In this case, the first rack force signal may generally also be used as an operating parameter, in particular for controlling the at least one steering function, and preferably for actuating the feedback actuator. This may improve operational reliability. In particular, the limitation ensures that, in the event that the operating parameter is used to actuate the feedback actuator, no excessive torque is allowed in the direction of a limit stop of the operating unit, which in particular could lead to safety-critical situations when driving without hands on the steering handle. Particularly in the case of driving around a curve, a steering force may be achieved in the direction of a neutral or straight-ahead position with a corresponding design of a front axis of the vehicle, wherein the steering force is correlated to the second rack force signal and thus may be used to limit the first rack force signal.

It is further proposed that a duration of the first rack force signal is determined outside the tolerance range for the first rack force signal and/or a distance of the first rack force signal from the tolerance range limits for the first rack force signal, and in the event that the duration exceeds a time limit and/or the distance exceeds a distance limit, a system response is initiated. For example, as a system response, the tolerance range determined by the second rack force signal may be reduced to the extent that the first rack force signal is directly limited to the second rack force signal. Alternatively or additionally, the system response may comprise, for example, generating an advisory message and/or a degradation of the vehicle and/or the steering system, for example, turning off and/or reducing the feedback moment in the event of generating a steering feel. This may in particular further increase robustness or operational reliability.

In accordance with an alternative embodiment, it is proposed that a first torque signal is determined from the first rack force signal and a second torque signal is determined from the second rack force signal, wherein the first torque signal is used to determine the operating parameter, and wherein a tolerance range for the first torque signal is determined by means of the second torque signal, and in the event that the first torque signal is outside the tolerance range for the first torque signal, the first torque signal is limited to the second torque signal and/or by means of the second torque signal. In the latter case, the first torque signal may be limited to, for example, the tolerance range determined by the second torque signal. In this case, in particular, the first torque signal may be used to control the steering function, and in particular to actuate the feedback actuator. This may also improve operational safety. The limitation in particular ensures that in the event that the operating parameter is used to actuate the feedback actuator, an excessive torque in the direction of a limit stop of the operating unit is not allowed.

Also in this case, it is proposed that a duration of the first torque signal is determined outside the tolerance range for the first torque signal and/or a distance of the first torque signal from the tolerance range limits for the first torque signal, and in the event that the duration exceeds a time limit and/or the distance exceeds a distance limit, a system response is initiated. For example, as a system response, the tolerance range determined by the second torque signal may be reduced to the extent that the first torque signal is directly limited to the second torque signal. Alternatively or additionally, however, the system response may also correspond to the aforementioned system response. This may in particular further increase robustness or operational reliability.

According to a further embodiment, it is proposed that a first partial signal, in particular a first rack force partial signal, and in particular a second partial signal, in particular a second rack force partial signal, is determined by means of the first calculation algorithm, in particular a second rack force partial signal, wherein the first rack force signal is determined from the first partial signal and the second partial signal. The second partial signal may be calculated, for example, as a function of a deflection of the steering handle and a vehicle speed. For example, a single-track model and/or a map may be used for this purpose. As a result, the first rack force signal may be particularly optimized and advantageously adjusted to the specific steering function.

Alternatively, it is proposed that a base signal, in particular a rack force base signal, is determined by the first calculation algorithm and that the base signal is modified by means of at least one modification characteristic correlated, in particular with the steering function, wherein the first rack force signal is determined from the modified base signal, in particular modified with the modification characteristic. The modification characteristic may be correlated, for example, with a steering characteristic or a steering behavior around a neutral or straight-ahead position, especially in the event that the steering function corresponds to the feedback moment provided by the feedback actuator or serves to adjust the steering feel on the steering handle. In particular, a variability may thereby be increased. In addition, the first rack force signal may be optimized and advantageously adjusted to the specific steering function.

In principle, a basic signal, in particular a rack force base signal, could also be determined from the aforementioned first partial signal and the aforementioned second partial signal, which is subsequently modified with a modification characteristic, in particular correlated to the steering function and used to determine the first rack force signal. Once again, in this case, the first rack force signal may be optimized and advantageously adjusted to the specific steering function.

Particularly high operational reliability may be achieved if at least a third rack force signal is determined for monitoring and/or checking the plausibility of the first rack force signal. Thus, the third rack force signal is used to at least monitor and/or check the plausibility of the first rack force signal. In addition, the third rack force signal may be advantageously considered in determining the operating parameter. In particular, a fourth calculation algorithm may be used in determining the third rack force signal. The third rack force signal may be particularly advantageously calculated as a function of a deflection of the steering handle and a vehicle speed. For example, a single-track model and/or a map may be used for this purpose. In addition, in this case, the fourth calculation algorithm may in particular correspond to the third calculation algorithm.

Furthermore, it is proposed that a further tolerance range for the first rack force signal is determined by means of the third rack force signal, and in the event that the first rack force signal is outside of the further tolerance range for the first rack force signal, the first rack force signal is limited to the second rack force signal and/or by means of the second rack force signal. In the latter case, the first rack force signal may be limited to, for example, the tolerance range determined by the second rack force signal. However, if the first rack force signal is outside of the further tolerance range for the first rack force signal, the first rack force signal could also be limited to the third rack force signal and/or by means of the third rack force signal. In particular, the first rack force signal may thus be monitored by means of two tolerance ranges, wherein, for example, in a first step, a check is performed of whether the first rack force signal is within the tolerance range limits for the first rack force signal and in a second step, a check is performed of whether the first rack force signal is within the tolerance range limits for the first rack force signal. Alternatively, the tolerance range determined, particularly by means of the second rack force signal, for the first rack force signal, and the further tolerance range determined, particularly by means of the third rack force signal, for the first rack force signal may also be combined to a common tolerance range for the first rack force signal. In this case, the first rack force signal is limited, in case the first rack force signal is outside the common tolerance range for the first rack force signal. This may further improve operational reliability.

In addition, in this case it is further proposed that a duration of the first rack force signal is determined outside the further tolerance range for the first rack force signal and/or a distance of the first rack force signal from the further tolerance range limits for the first rack force signal, and in the event that the duration exceeds a further time limit and/or the distance exceeds a further distance limit, a system response is initiated. The system response may correspond to the aforementioned system response. In this case, when using a common tolerance range for the first rack force signal, a duration of the first rack force signal may also be determined outside of the common tolerance range for the first rack force signal and/or a distance of the first rack force signal may be determined from the common tolerance range limits for the first rack force signal, and in the event that the duration exceeds a common time limit and/or the distance exceeds a common distance limit, a system response may be initiated. This may in particular further increase robustness or operational reliability.

The method for operating the steering system and the vehicle are not intended to be limited to the application and embodiment described hereinabove. In particular, the method for operating the steering system and the vehicle in order to achieve the functioning described herein may comprise a number of individual elements, components, and units that differ from the number specified herein.

BRIEF DESCRIPTION OF THE DRAWINGS

Further advantages follow from the description of the drawings below. Multiple exemplary embodiments of the disclosure are illustrated in the drawings.

The figures show.

DETAILED DESCRIPTION

Figure 1A:
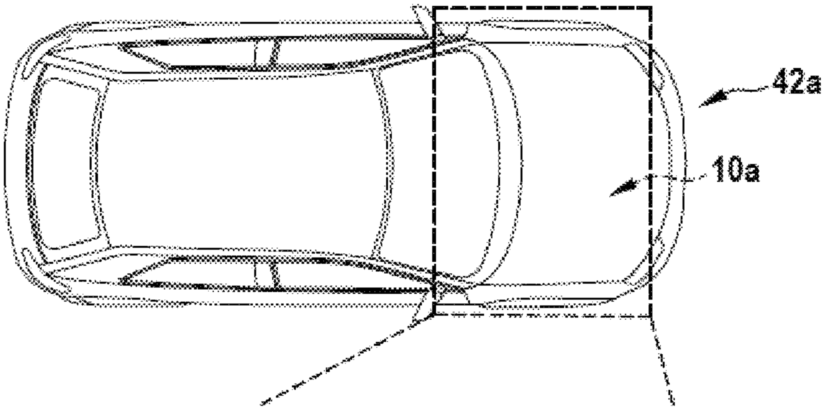
FIGS. 1a-b a vehicle with a steering system designed as a steer-by-wire steering system in a simplified representation, FIG. 2 a signal flow chart for determining an operating parameter, which is in particular used to control at least one steering function, FIG. 3 an exemplary flow chart comprising the main method steps of a method for operating the steering system, FIG. 4 a further signal flow chart for determining an operating parameter according to a further exemplary embodiment of the disclosure, and FIG. 5 a further signal flow chart for determining an operating parameter in accordance with a further exemplary embodiment of the disclosure.
Figure 1B:
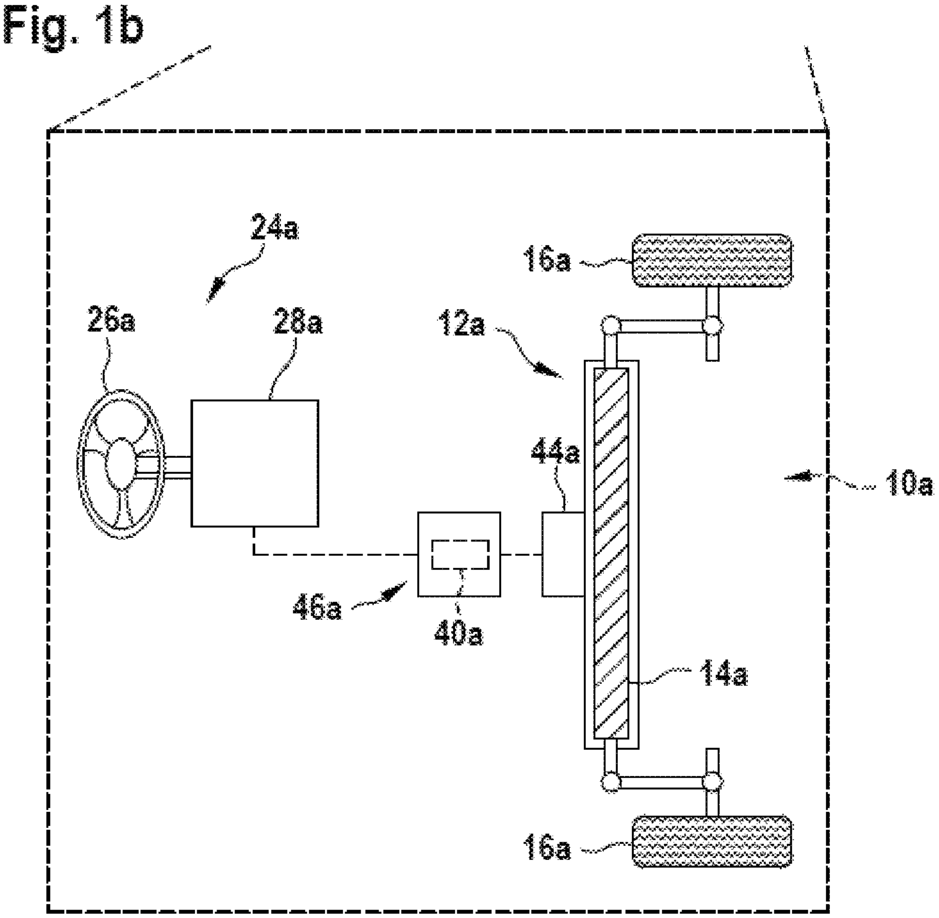

FIGS. 1a and 1b show a simplified illustration of a vehicle 42a which is, e.g., designed as a passenger vehicle comprising a plurality of vehicle wheels 16a and a steering system 10a. The steering system 10a has an operative connection with the vehicle wheels 16a and is intended to influence a direction of travel of the vehicle 42a. Furthermore, the steering system 10a is designed as a steer-by-wire steering system in the present case, in which a steering specification is transmitted electrically to the vehicle wheels 16a in at least one operating state.

The steering system 10a comprises an operating unit 24a, in particular actuatable by a driver and/or an occupant. The operating unit 24a comprises a steering handle 26a, for example, in the form of a steering wheel, and a feedback actuator 28a which is in particular mechanically coupled to the steering handle 26a. The feedback actuator 28a is provided to provide an active feedback torque and thereby to generate a steering resistance and/or a restoring torque on the steering handle 26a. Accordingly, the feedback actuator 28a is provided for generating a steering feel on the steering handle 26a. A steering handle could alternatively also be designed as a joystick, a steering lever, and/or as a steering ball or the like.

The steering system 10a further comprises a wheel steering angle adjuster 12a. The wheel steering angle adjuster 12a is mechanically separated from the operating unit 24a. The wheel steering angle adjuster 12a is purely electrically connected to the operating unit 24a. Furthermore, the wheel steering angle adjuster 12a is, e.g., designed as a central actuator. The wheel steering angle adjuster 12a is operatively connected to at least two of the vehicle wheels 16a, in particular two front wheels, and is intended to convert the steering specification into a steering movement of the vehicle wheels 16a. To this end, the wheel steering angle adjuster 12a comprises a rack 14a and a steering actuator 44a cooperating with the rack 14a, in particular in the form of an electric motor. A steering system could in principle also comprise a plurality of wheel steering angle adjusters, in particular designed as single wheel actuators. Further, a steering actuator could be configured as, for example, a linear drive and/or comprise a plurality of electric motors.

The vehicle 42a further comprises a control device 46a. In the present case, the control device 46a is designed as a steering control device and is therefore part of the steering system 10a. The control device 46a comprises an electrical connection to the wheel steering angle adjuster 12a. The control device 46a also comprises an electrical connection to the operating unit 24a. The control device 46a is provided at least for controlling an operation of the steering system 10a. The control device 46a comprises a computing unit 40a for this purpose. The computing unit 40a comprises at least one processor (not depicted), e.g., in the form of a microprocessor, and at least one operating memory (not depicted). The computing unit 40a also comprises at least one operating program stored in the operating memory and has at least one control routine, at least one calculation routine, at least one evaluation routine, and/or at least one determination routine. A control device could in principle also be different from a steering control device and designed, e.g., as a single, central vehicle control device having a central computing unit. It is also conceivable to provide separate control devices and/or computing units for one wheel steering angle adjuster as well as one operating unit and communicatively interconnect them.

To improve operational safety, a method for operating the steering system 10a is proposed hereinafter. In the present case, the computing unit 40a is provided to perform the method and comprises for this purpose a computer program having corresponding program code means. In general, however, another computing unit, for example a central vehicle control device, could alternatively be provided for performing the method.

Figure 2:
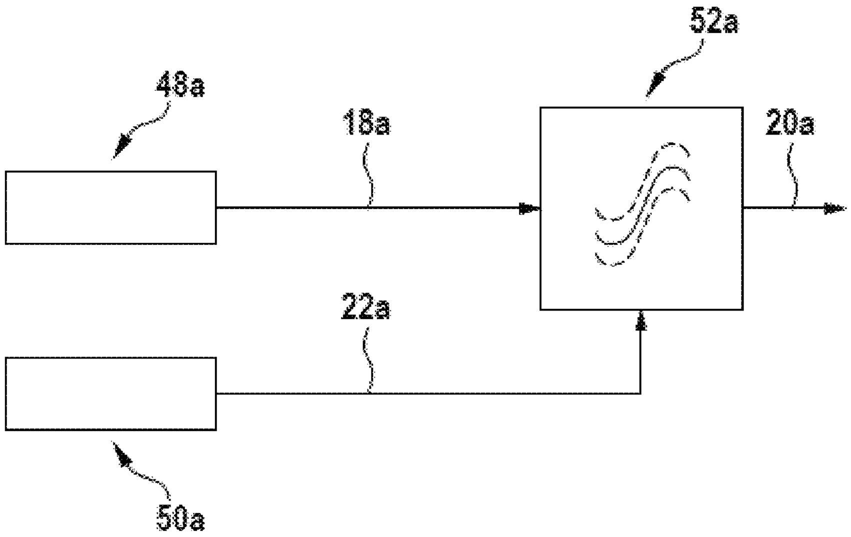

The description hereinafter relates to FIG. 2, in which an exemplary signal flow chart is shown.

In the present case, a dynamic, advantageously a movement, of rack 14a is determined and a first rack force signal 18a is determined based on the dynamic of rack 14a by means of a first calculation block 48a. The first calculation block 48a comprises a first calculation algorithm used to determine the first rack force signal 18a. For example, the first calculation algorithm for calculating the first rack force signal 18a may utilize a motion equation of the rack 14a and take into account at least one further steering characteristic, such as a transmission and/or motor behavior of steering actuator 44a and/or friction effects in the wheel steering angle adjuster 12a and/or inertia effects in the wheel steering angle adjuster 12a. The more accurately the first rack force signal 18a is calculated, the more realistically this interaction between the vehicle 42a and a vehicle subsurface may be determined.

By means of the first rack force signal 18a, an operating parameter 20a may then be determined, which may be used, for example, to control at least one steering function. In the present case, the operating parameter 20a is used, by way of example, to actuate the feedback actuator 28a. In this case, the steering function accordingly corresponds to a feedback torque provided by the feedback actuator 28a to apply to the steering handle 26a and serves to adjust a steering feel. The actuation of the feedback actuator 28a with the operating parameter 20a is carried out according to the type of control. However, alternatively or additionally, the operating parameter 20a may also be used in a vehicle system other than the steering system 10a and used to control a corresponding vehicle function.

Further, in the present case, a second rack force signal 22a is determined based on the dynamic of the rack 14a using a second calculation block 50a. The second calculation block 50a comprises a second calculation algorithm used to determine the second rack force signal 22a and having a lower complexity as compared to the first calculation algorithm. For example, the second calculation algorithm may utilize a motion equation of the rack 14a to calculate the second rack force signal 22a, but may omit at least one of the aforementioned further steering characteristics, such as a frictional fraction and/or an inertia fraction, when calculating second rack force signal 22a.

The second rack force signal 22*a* is further used to monitor and/or check the plausibility of the first rack force signal 18*a*. To this end, the first rack force signal 18*a* and the second rack force signal 22*a* are fed into a monitoring block 52*a*, which determines a tolerance range for the first rack force signal 18*a* by means of the second rack force signal 22*a*. If the first rack force signal 18*a* is within the limits of the tolerance range, the operating parameter 20*a* is determined in a manner separately known from the first rack force signal 18*a*. In principle, the first rack force signal 20*a* may also be used as the operating parameter 20*a*. On the other hand, if the first rack force signal 18*a* is outside the tolerance range, the first rack force signal 18*a* is limited by means of the second rack force signal 22*a*. In the present case, the first rack force signal 18*a* may be limited to, for example, the tolerance range determined by the second rack force signal 22*a*. The limitation ensures that no excessive torque is allowed in the direction of a limit stop of the operating unit 24*a*, which could lead to safety-critical situations, especially when traveling without hands on the steering handle 26*a*. Particularly in the case of driving around a curve, a steering force may be achieved in the direction of a neutral or straight-ahead position with a corresponding design of a front axis of the vehicle 42*a*, wherein the steering force is correlated to the second rack force signal 22*a* and thus may be used to limit the first rack force signal 18*a*.

Moreover, by means of an additional monitoring algorithm, which may be implemented directly in monitoring block 52*a*, for example, a duration of the first rack force signal 18*a* outside of the tolerance range and/or a distance of the first rack force signal 18*a* from the limits of the tolerance range may be determined, and in the event that the duration exceeds a time limit and/or the distance exceeds a distance limit, a system response may be initiated. For example, as a system response, the tolerance range determined by the second rack force signal 22*a* may be reduced to the extent that the first rack force signal 18*a* is directly limited to the second rack force signal 22*a*. Alternatively or additionally, however, the system response may also comprise generating an advisory message and/or a degradation of the vehicle 42*a* and/or the steering system 10*a*, for example, in the present case in the form of a shutdown and/or a reduction in the feedback moment of the feedback actuator 28*a*.

Figure 3:
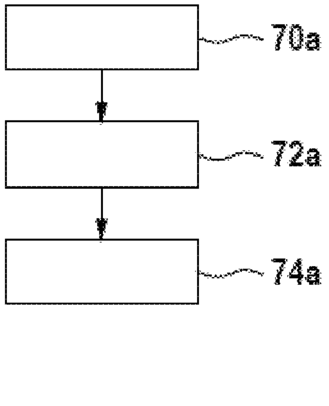

Finally, FIG. 3 shows an exemplary flow chart with the main method steps of a method for operating the steering system 10*a*.

In a method step 70*a*, based on the dynamic of rack 14*a*, the first rack force signal 18*a* is determined, wherein the first calculation algorithm is used in determining the first rack force signal 18*a*. In addition, as a function of the first rack force signal 18*a*, the operating parameter 20*a* may be determined, which may be used, for example, to control at least one steering function, such as a steering feel.

In a method step 72*a*, the second rack force signal 22*a* is determined based on the dynamic of the rack 14*a*, wherein the second rack force signal 22*a* is determined using the second computational algorithm, which is in particular of a lower complexity as compared to the first computational algorithm.

In a method step 74*a*, the second rack force signal 22*a* is used to monitor and/or check the plausibility of the first rack force signal 18*a*. For example, a tolerance range for the first rack force signal 18*a* may be determined by means of the second rack force signal 22*a*, and in the event that the first rack force signal 18*a* is outside of the tolerance range, the first rack force signal 18*a* may be limited to the second rack force signal 22*a* or by means of the second rack force signal 22*a*. Alternatively, however, it is also conceivable to first transform or convert a first rack force signal and/or a second rack force signal into another operational signal and use these operational signals for monitoring and/or checking plausibility or for determining a tolerance range (cf. also the description for the following exemplary embodiment).

The exemplary flow chart in FIG. 3 is only intended to describe an exemplary method for operating the steering system 10*a*. In particular, individual method steps may also vary, or additional method steps may be added. For example, it is conceivable to use an additional monitoring algorithm, a duration of the monitored signal, in the present case, in particular, the first rack force signal 18*a*, outside of the tolerance and/or a distance of the monitored signal, in the present case, in particular, the first rack force signal 18*a*, from the tolerance range limits, and if the duration exceeds a time limit and/or the distance exceeds a distance limit, to initiate a system response.

Figure 4:
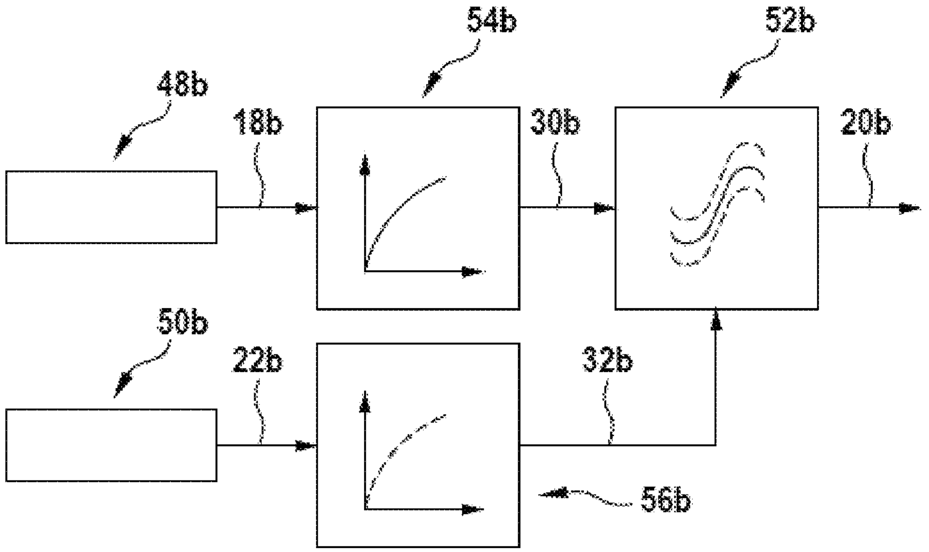
Figure 5:
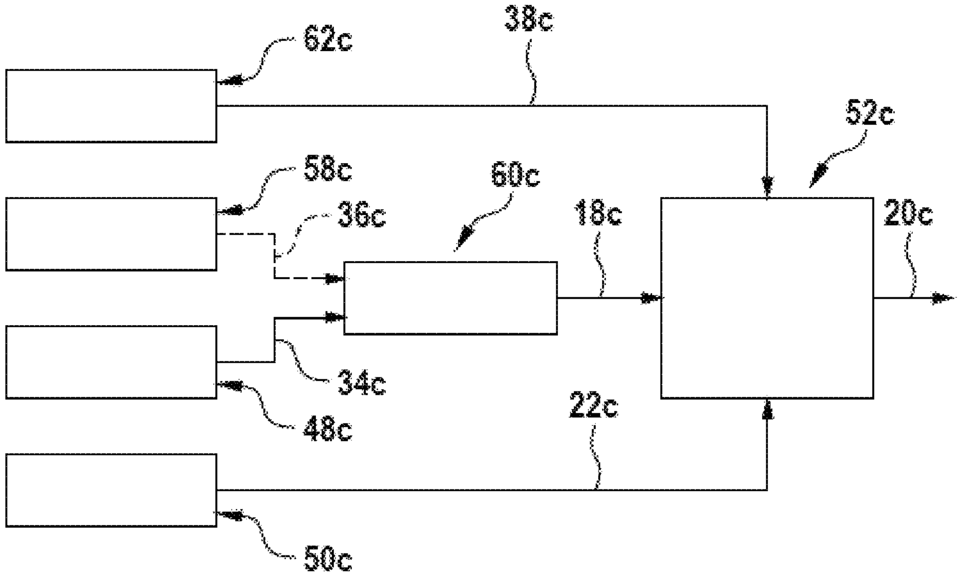

FIGS. 4 and 5 show further exemplary embodiments of the disclosure. The following descriptions and the drawings are substantially limited to the differences between the exemplary embodiments, wherein reference may also be made in principle to the drawings and/or the description of the other exemplary embodiments, in particular FIGS. 1 to 3, with regard to components with the same reference numerals, in particular with regard to components having the same reference signs. To differentiate between the exemplary embodiments, the letter a is placed after the reference numerals of the exemplary embodiment in FIGS. 1 to 3. The letter a is replaced by the letters b and c in the exemplary embodiments in FIGS. 4 and 5.

FIG. 4 shows a first exemplary embodiment of the disclosure. The exemplary embodiment of FIG. 4 is shown by the letter b. The further exemplary embodiment of FIG. 4 differs from the previous exemplary embodiment at least substantially by the operating signals used for monitoring and/or checking plausibility or for determining a tolerance range.

Analogously to the previous embodiment, a first rack force signal 18*b* is determined by a first calculation block 48*b*, and a second rack force signal 22*a* is determined by a second calculation block 50*b*.

In this case, however, the first rack force signal 18*b* is fed into a first conversion block 54*b*, which determines a first torque signal 30*b* based on the first rack force signal 18*b*. To this end, the first conversion block 54*b* may comprise, for example, a characteristic curve and/or a map, which depicts a rack force against a torque. However, a corresponding calculation algorithm could generally also be used. By means of the first torque signal 30*b*, an operating parameter 20*b* may then be determined, which may in particular be used to control at least one steering function, for example a steering feel.

Analogously, the second rack force signal 22*b* is fed into a second conversion block 56*b*, which determines a second torque signal 32*b* based on the second rack force signal 22*b*. To this end, the second conversion block 56*b* may comprise, for example, a characteristic curve and/or a map, which depicts a rack force against a torque. However, a corresponding calculation algorithm could generally also be used.

The second rack force signal 22*b*, or more specifically, the second torque signal 32*b* determined from the second rack force signal 22*b*, is further used to monitor and/or check the plausibility of the first rack force signal 18*b*, or more specifically, the first torque signal 30*b* determined from the first rack force signal 18*b*. To this end, the first torque signal 30*b* and the second torque signal 32*b* are fed into a monitoring block 52*b*, which determines a tolerance range for the first torque signal 30*b* by means of the second torque signal 32*b*. If the first torque signal 30*b* is within the limits of the tolerance range, the operating parameter 20*b* is determined from the first torque signal 30*b* in a separately known manner. In principle, the first torque signal 30*b* may also be used as the operating parameter 20*b*. On the other hand, if the first torque signal 30*b* is outside the tolerance range, the first torque signal 30*b* is limited to the second torque signal 32*b* and/or by means of the second torque signal 32*b*.

Moreover, once again by means of an additional monitoring algorithm, which may be implemented directly in monitoring block 52*b*, for example, a duration of the first torque signal 30*b* outside of the tolerance range and/or a distance of the first torque signal 30*b* from the limits of the tolerance range may be determined, and in the event that the duration exceeds a time limit and/or the distance exceeds a distance limit, a system response may be initiated.

FIG. 5 illustrates a further exemplary embodiment of the disclosure. The exemplary embodiment of FIG. 5 is shown by the letter c. The further exemplary embodiment of FIG. 5 differs from the previous exemplary embodiments at least substantially by the composition of a first rack force signal 18*c* as well as by the operating signals used for monitoring and/or checking plausibility or for determining a tolerance range.

In the present case, a first partial signal 34*c*, in particular a first rack force partial signal, is determined by means of a first calculation block 48*c*. The first calculation block 48*c* is identical to a first calculation block 48*a*, 48*b* of the previous exemplary embodiments and accordingly comprises a first calculation algorithm. For example, the first calculation algorithm may utilize a rack motion equation to calculate the first partial signal 34*c* and take into account at least one further steering characteristic, such as a transmission and/or motor behavior of a steering actuator and/or friction effects in the wheel steering angle adjuster and/or inertia effects in the wheel steering angle adjuster. Further, a second partial signal 36*c*, in particular a second rack force partial signal, is determined by means of a third calculation block 58*c*. The third calculation block 58*c* comprises a third calculation algorithm used to determine the second partial signal 36*c*. The second partial signal 36*c* may be calculated, for example, based on a single-track model and as a function of a deflection of a steering handle and a vehicle speed. The first partial signal 34*c* and the second partial signal 36*c* are subsequently fed into an overlay block 60*c*, which determines the first rack force signal 18*c* from the first partial signal 34*c* and the second partial signal 36*c*. Accordingly, in this case, the first calculation algorithm is also used in determining the first rack force signal 18*c*. By means of the first rack force signal 18*c*, an operating parameter 20*c* may then be determined, which may in particular be used to control at least one steering function, for example a steering feel. Alternatively, however, in this case, a basic signal could also be determined by means of a first calculation algorithm and the basic signal could be modified by means of at least one modification variable, wherein a first rack force signal is determined from the modified basic signal. It is also contemplated that a basic signal may be determined from the aforementioned first partial signal 34*c* and the aforementioned second partial signal 36*c*, which is subsequently modified with a modification characteristic and used to determine the first rack force signal.

Further, analogous to the previous exemplary embodiments, a second rack force signal 22*c* is determined by a second calculation block 50*c*.

Moreover, in this case, a third rack force signal 38*c* is determined. In the present case, the third rack force signal 38*c* is determined by a fourth calculation block 62*c*. The fourth calculation block 62*c* comprises a fourth calculation algorithm used to determine the third rack force signal 38*c*. For example, the third rack force signal 38*c* may be calculated based on a single-track model and as a function of steering handle deflection and vehicle speed. Accordingly, the fourth calculation algorithm may correspond to the third calculation algorithm.

The second rack force signal 22*c* and the third rack force signal 38*c* are in this case used to monitor and/or check the plausibility of the first rack force signal 18*c*. To this end, the first rack force signal 18*c*, the second rack force signal 22*c*, and the third rack force signal 38*c* are fed into a monitoring block 52*c*, which determines a, particularly common, tolerance range for the first rack force signal 18*c* by means of the second rack force signal 22*c* and the third rack force signal 38*c*. If the first rack force signal 18*c* is within the limits of the tolerance range, the operating parameter 20*c* is determined from the first rack force signal 18*c* in a separately known manner. In principle, the first rack force signal 20*c* may also be used as the operating parameter 20*c*. Conversely, if the first rack force signal 18*c* is outside the tolerance range, the first rack force signal 18*c* is limited to the second rack force signal 22*c*. Alternatively, however, it could also be limited to the third rack force signal 38*c*. In this case, the limitation may also ensure that in the event that the operating parameter 20*c* is used to actuate a feedback actuator, no excessive torque is allowed in the direction of a limit stop of a control unit, which in particular could lead to safety-critical situations when driving without hands on a steering handle. Particularly in the case of driving around a curve, a steering force may be achieved in the direction of a neutral or straight-ahead position with a corresponding design of a front axis of the vehicle, wherein the steering force is correlated to the second rack force signal 22*c* and thus may be used to limit the first rack force signal 18*c*. Alternatively, however, the first rack force signal 18*c* could also be monitored by way of two consecutive tolerance ranges, wherein, for example, a check is carried out in a first step, to determine whether the first rack force signal 18*c* is within the limits of a tolerance range determined by the second rack force signal 22*c* for the first rack force signal 18*c* and a check is performed in a second step to determine whether the first rack force signal 18*c* is within the limits of a further tolerance range determined by the third rack force signal 38*c* for the first rack force signal 18*c*.

In addition, in this case, by means of an additional monitoring algorithm, which may be implemented directly in monitoring block 52*c*, for example, a duration of the first rack force signal 18*c* outside of the tolerance range and/or a distance of the first rack force signal 18*c* from the limits of the tolerance range may be determined, and in the event that the duration exceeds a time limit and/or the distance exceeds a distance limit, a system response may be initiated.

What is claimed is:

1. A method of operating a steering system comprising at least one wheel steering angle adjuster having a rack for changing a wheel steering angle of at least one vehicle wheel, the method comprising:

determining a first rack force signal based on a dynamic of the rack using a first calculation algorithm;

determining an operating parameter as a function of the first rack force signal, the operating parameter used to control at least one steering function;

determining at least one second rack force signal using a second calculation algorithm having a lower complexity compared to the first calculation algorithm; and monitoring and/or checking a plausibility of the first rack force signal based on the at least one second rack force signal.

2. The method according to claim 1, wherein:

the steering system further comprises a control unit separate from the at least one wheel steering angle adjuster, a steering handle, and a feedback actuator operably connected to the steering handle, and the operating parameter is used to at least actuate the feedback actuator.

3. The method according to claim 1, further comprising:

calculating the first rack force signal and the at least one second rack force signal from a motion equation of the rack.

4. The method according to claim 1, further comprising:

determining a tolerance range for the first rack force signal based on the at least one second rack force signal, and when the first rack force signal is outside of the tolerance range, limiting the first rack force signal based on the at least one second rack force signal.

5. The method according to claim 4, further comprising:

determining a duration of the first rack force signal outside of the tolerance range and/or determining a distance of the first rack force signal from limits of the tolerance range; and initiating a system response when the duration exceeds a time limit and/or the distance exceeds a distance limit.

6. The method according to claim 1, further comprising:

determining a first torque signal from the first rack force signal;

determining a second torque signal from the at least one second rack force signal;

using the first torque signal to determine the operating parameter;

determining a tolerance range for the first torque signal based on the second torque signal; and when the first torque signal is outside of the tolerance range, limiting the first torque signal based on the second torque signal.

7. The method according to claim 6, further comprising:

determining a duration of the first torque signal outside of the tolerance range and/or a distance of the first torque signal from limit values of the tolerance range; and initiating a system response when the duration exceeds a time limit and/or the distance exceeds a distance limit.

8. The method according to claim 1, further comprising:

determining a first partial signal using the first calculation algorithm; and determining a second partial signal using a third calculation algorithm, wherein (i) the first rack force signal is determined based on the first partial signal and the second partial signal, or (ii) a base signal is determined using the first calculation algorithm and the base signal is modified based on at least one modification characteristic correlated to the at least one steering function to form a modified base signal, and the first rack force signal is determined from the modified base signal.

9. The method according to claim 1, further comprising:

determining at least a third rack force signal for monitoring and/or checking the plausibility of the first rack force signal.

10. The method according to claim 9, further comprising:

calculating the third rack force signal based on a steering handle deflection and a vehicle speed.

11. The method according to claim 9, wherein:

the third rack force signal determines a further tolerance range for the first rack force signal; and when the first rack force signal is outside the further tolerance range, the first rack force signal is limited by the at least one second rack force signal.

12. The method according to claim 11, further comprising:

determining a duration of the first rack force signal outside of the further tolerance range and/or a distance of the first rack force signal from limits of the further tolerance range; and initiating a system response when the duration exceeds a further time limit and/or the distance exceeds a further distance limit.

13. A computing unit for performing the method according to claim 1.

14. A vehicle, comprising: a steering system including an at least one wheel steering angle adjuster with a rack for changing a wheel steering angle of an at least one vehicle wheel; and the computing unit according to claim 13.

* * * * *